United States Patent [19]

Satomi et al.

[11] Patent Number: 5,134,501
[45] Date of Patent: Jul. 28, 1992

[54] FACSIMILE APPARATUS

[75] Inventors: Mitsuo Satomi; Tooru Ohnishi, both of Kyoto, Japan

[73] Assignee: Murata Kikai Kabushiki Kaisha, Kyoto, Japan

[21] Appl. No.: 455,600

[22] Filed: Dec. 21, 1989

[30] Foreign Application Priority Data

Dec. 29, 1988 [JP] Japan .................. 63-170225[U]
Feb. 17, 1989 [JP] Japan .................... 1-39133

[51] Int. Cl.$^5$ .............................................. H04N 1/00
[52] U.S. Cl. ................................. 358/400; 358/405; 358/434
[58] Field of Search ............ 358/406, 405, 404, 403, 358/402, 401, 400, 434, 437, 439, 440, 441; 379/100; 371/2.1, 2.2, 72

[56] References Cited

U.S. PATENT DOCUMENTS 4,887,268 12/1989 Tohara .................. 371/2.1

FOREIGN PATENT DOCUMENTS 60-194667 10/1985 Japan ...................... 379/100
62-135059 6/1987 Japan ...................... 379/100
63-237644 10/1988 Japan ...................... 358/405

Primary Examiner—Edward L. Coles, Sr.
Assistant Examiner—Thomas D. Lee
Attorney, Agent, or Firm—Spensley Horn Jubas & Lubitz

[57] ABSTRACT

According to the present invention, names of remote stations with which communication often is carried out is registered in a registration means, by which an error report using receiving papers is prepared only for communication errors at the time when communication is carried out with such remote stations.

The facsimile apparatus comprising a buffrermemory which decode and stores each control procedure signal, a registration means which registered whether it is necessary to prepare an error report or not, a specific station deciding means, a means which detects occurrence of communication errors, a printing unit, and a control unit which controls so as to drive the printing unit and print stored contents in the buffer memory.

11 Claims, 18 Drawing Sheets

FIG. 2

COMPACTED DIAL TABLE

| COMPACTED NUMBER | TELEPHONE NUMBER | T30 MONITOR BIT |
|---|---|---|
| 01 | 075-123-4567 | 1 |
| 02 | 03-123-9876 | 0 |
| | | |

FIG. 3

T30 MONITOR BUFFER

| | |
|---|---|
| TIMER VALUE | A1 |
| TRANSMITTING BIT | A2 |
| DATA 1 | A3 |
| DATA 2 | A4 |
| | |

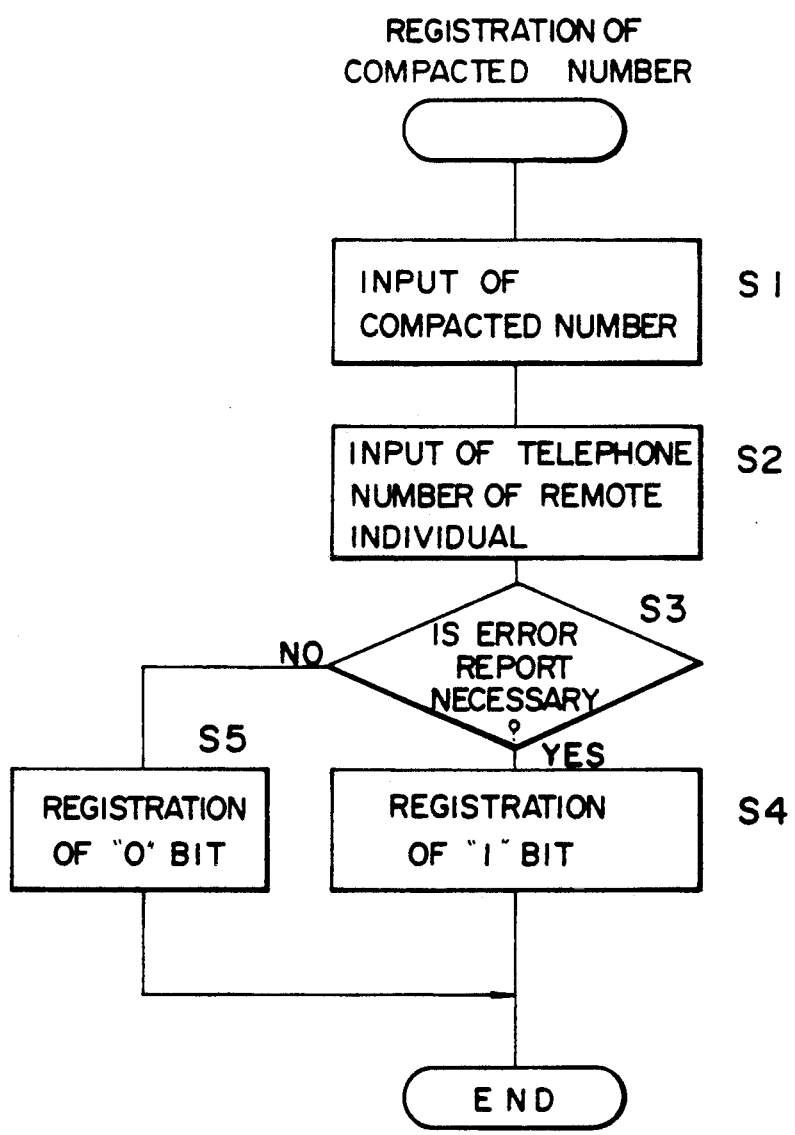

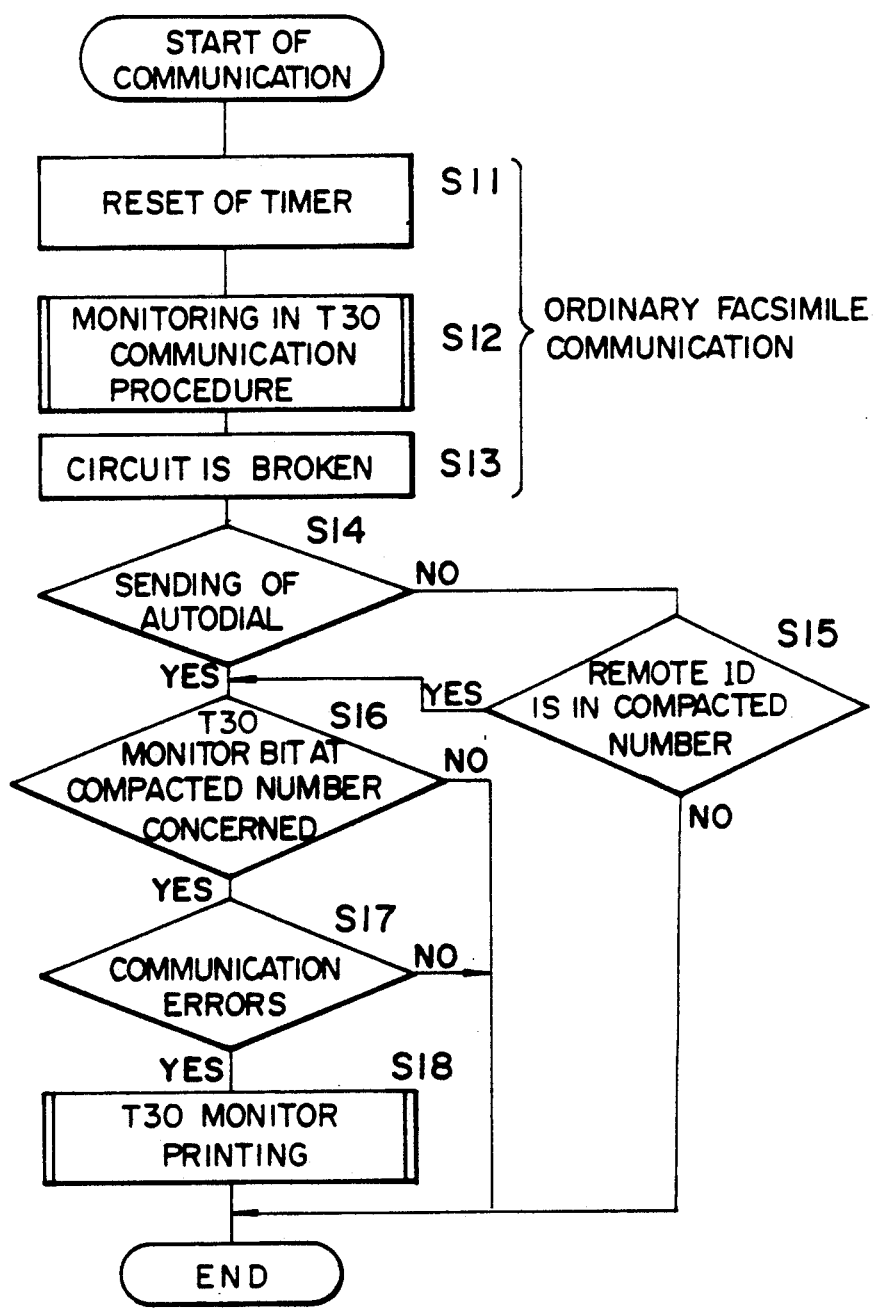

FIG. 9

1989.1.1 (MON.) 4:14

| INTERVAL | SIGNAL | DATA | | | | | |
|---|---|---|---|---|---|---|---|
| 00'05"12 | T-NSF | 00 | 00 | A2 | 01 | 02 | 03 |
| 00'00"01 | T-DIS | 00 | 73 | 1D | 00 | | |
| 00'03"65 | R-NSS | 00 | 00 | A2 | 01 | 02 | 03 |
| 00'00"00 | R-DCS | 00 | 61 | 11 | 00 | | |
| 00'00"38 | R-****TRN | 00 | | | | | |
| 00'01"00 | R-****TCF | 00 | 00 | 00 | | | |
| 00'00"73 | T-FTT | | | | | | |
| 00'02"98 | R-NSS | 00 | 00 | A2 | 01 | 02 | 03 |
| 00'00"00 | R DCS | 00 | 61 | 11 | 00 | | |
| 00'00"38 | R-****TRN | 00 | | | | | |
| 00'00"00 | R-****TCF | 00 | 00 | 00 | | | |
| 00'00"73 | T-FTT | | | | | | |
| 00'02"98 | R-NSS | 00 | 00 | A2 | 01 | 02 | 03 |
| 00'00"00 | R-DCS | 00 | 71 | 11 | 00 | | |
| 00'00"37 | R-*** TRN | 00 | | | | | |
| 00'01"01 | R-*** TCF | 01 | 00 | 00 | | | |
| 00'00"74 | T-CFR | | | | | | |

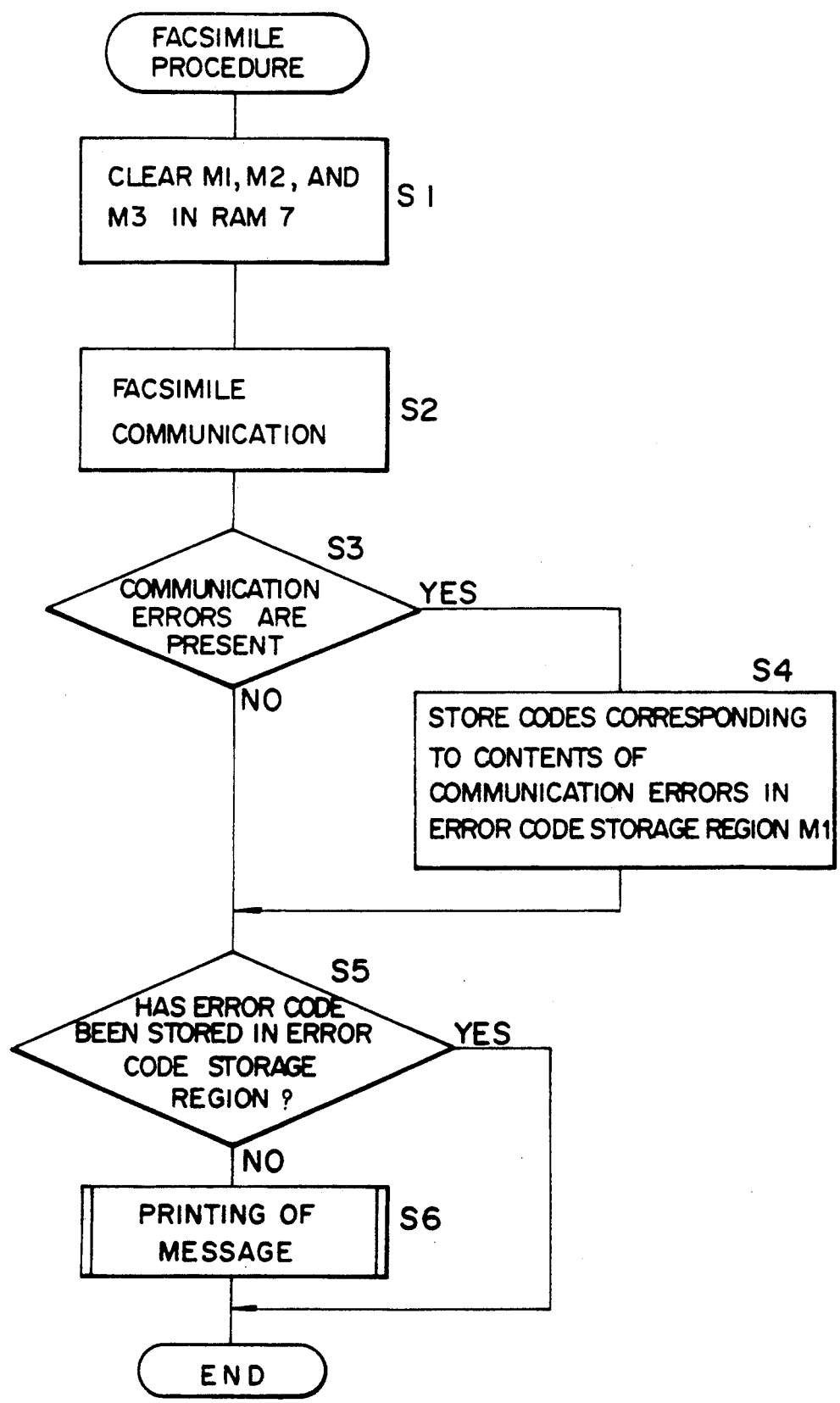

FACSIMILE APPARATUS

FIELD OF THE INVENTION

The present invention relates to a facsimile apparatus, and particularly, to a proposal for preparing, in the case where communication errors occur, a report on the errors.

RELATED ART STATEMENT

When, in a facsimile apparatus, circuit conditions become worse or faults in an apparatus occur under communication, communication errors occur, and the circuit is broken on the way of communication. In this case, in order to inform an operator of the communication errors, the effect is formerly displayed on a liquid crystal display in a small-sized apparatus. The communication errors are recorded on a receiving paper in an apparatus larger than a middle-sized apparatus.

It is for avoiding waste of receiving papers because of a little amount of receiving papers that the communication errors are not recorded on a receiving paper in a small-sized apparatus. But, the method of displaying the effect on a display is bad in preservation, and it is said that the method of recording the communication errors on a receiving paper adopted in an apparatus larger than a middle-sized apparatus is superior to the former method.

Now, if all of communication errors are recorded on a receiving paper every occurrence of communication errors like the conventional art, receiving papers used in recording of receiving information are wasted. It is said that it is not necessary to take the trouble to report the communication errors in the form of a report in the case where communication errors occur between its own station and a remote station with which communication is not particularly often carried out.

OBJECT AND SUMMARY OF THE INVENTION

The object of the present invention is, in consideration of such the point, to provide a useful facsimile apparatus capable of assuring effective use of receiving papers by such a way that a communication error report is prepared for communication errors between its own station and such a necessary station as a remote station with which communication often is carried out, and on the other hand, a report using receiving papers is not prepared for communication errors between its own station and a remote station with which communication is not often carried out.

In order to accomplish the above-mentioned object, the facsimile apparatus related to the present invention is characterized in comprising a buffer memory which decodes and stores therein each control procedure signal for transmission and reception and the other predetermined data from among transmission and reception signals, a registration means which registers whether it is necessary to prepare an error report or not in the case where communication errors occur between an intra-office station and any remote station, a specific station deciding means which decides whether or not a remote station under communication is a specific remote station registered in the registration means from a transmitting terminal identification signal (TSI) or a called terminal identification signal (CSI), a means which detects occurrence of communication errors, a printing unit which converts information stored in said buffer memory into characters and numerals and prints them using a predetermined report format; and a control unit which controls so as to drive said printing unit and print stored contents in said buffer memory when a remote station under communication is decided to be a station registered in said registration means, and communication errors occur under communication with the station.

According to an embodiment of the present invention, names of remote stations with which communication often is carried out are registered in a registration means, by which an error report using receiving papers is prepared only for communication errors at the time when communication is carried out with such remote stations. Incidentally, regarding errors in communication with remote stations not registered in the registration means, there can be adopted a method in which the errors are displayed on a liquid crystal display, for example, as in a small-sized apparatus.

The facsimile apparatus mentioned above is provided with a character generator. In case that the character generator is not provided, the object of the present invention is also accomplished by the facsimile apparatus mentioned below.

The facsimile apparatus is characterized in comprising a printing means for carrying out printing on a recording paper, a means for detecting various kinds of communication errors, a first memory in which a communication error display code corresponding to a communication error is coded beforehand and stored, a second memory in which a program for preparing a printing pattern corresponding to an error display code is stored, and a printing control means which reads the code data from the first memory, prepares a printing pattern based on the program stored in the second memory, and outputs the printing pattern to the printing means.

According to the above-mentioned configuration, when a communication error occurs, the printing control means prepares a printing pattern based on a program and outputs the printing pattern to the printing means. By this, an error display mark is recorded on a recording paper.

BRIEF DESCRIPTION OF THE DRAWINGS

FIG. 2 is a diagram showing a compacted dial table;

FIG. 3 is a diagram of a memory map of a monitor buffer memory;

FIG. 4 is a flowchart showing a registration procedure for a compacted dial;

FIG. 5 is a signal sequence diagram in facsimile communication.

FIG. 6 to FIG. 8 each are a flowchart explanatory of a preparation operation of an error report when communication errors take place;

FIG. 9 is a diagram showing an error report prepared by the above-mentioned flowcharts;

FIG. 12 is a flowchart showing a main routine in the time when a facsimile apparatus communicates;

DETAILED DESCRIPTION OF PREFERRED EMBODIMENT

Figure 1:
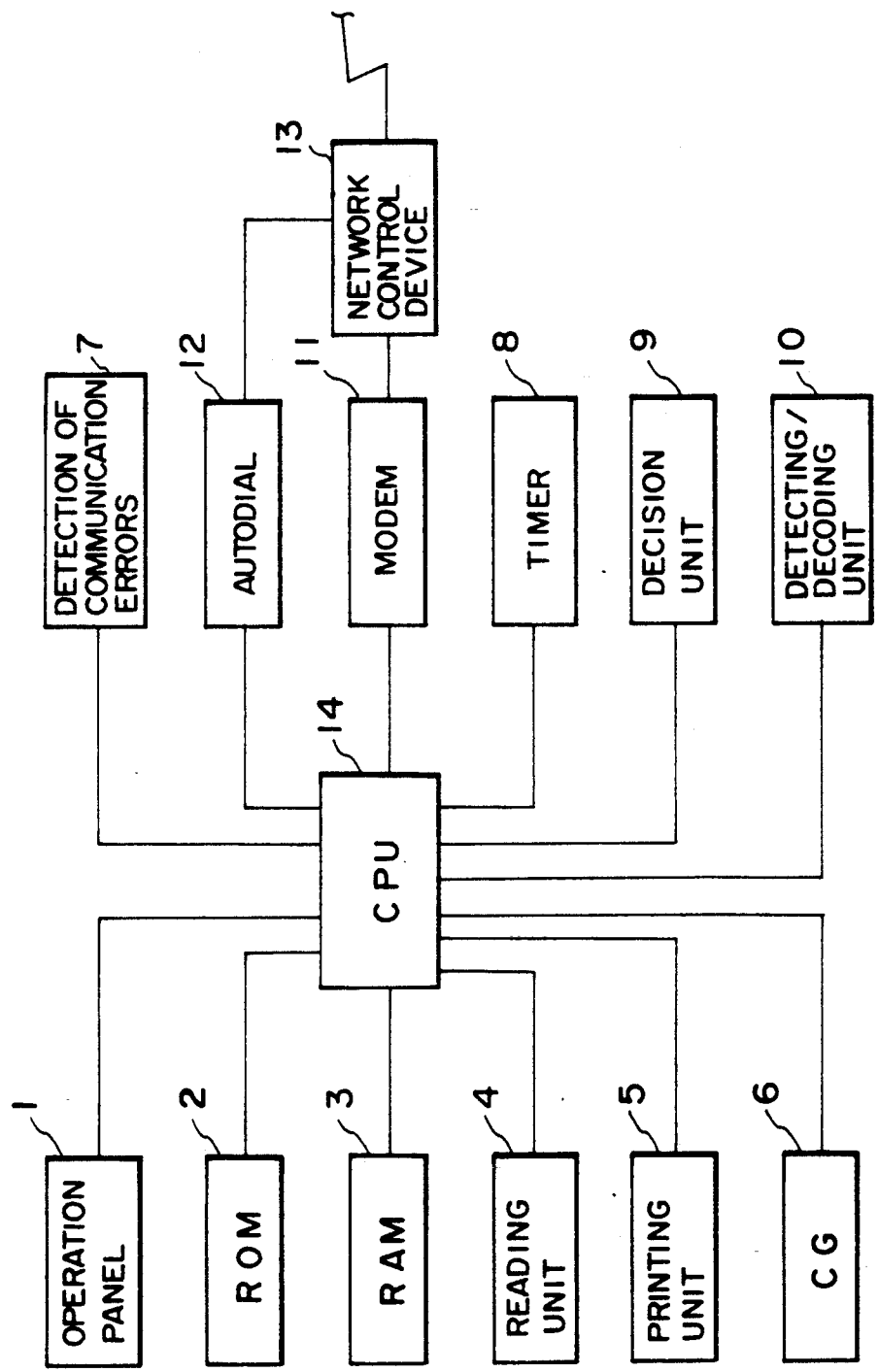
FIG. 1 is a block diagram showing a facsimile apparatus as one embodiment according to the present invention.

FIG. 1 shows a block diagram of a facsimile apparatus as an embodiment according to the present invention, and reference numeral 1 is an operation panel having a ten-key, a function key, a liquid crystal display, and the like, 2 a ROM which stores system programs and the like therein, and 3 a RAM in which a compacted dial table as shown in FIG. 2 and a T-30 monitor buffer region are provided. Reference numeral 4 is a reading unit which contains a CCD, 5 a printing unit which contains a thermal head, 6 a character generator which generates a character pattern when a character code is input therein, and 7 a communication error detecting unit. The communication error detecting unit 7 decides whether or not a control procedure signal is returned from a facsimile apparatus in a remote station and a control procedure signal returned for a signal originating from its own station is a procedure signal based on the CCITT Recommendation T-30, and in the case where the answer is NO, the communication error detecting unit decides that communication errors occur. Reference numeral 8 is a timer for measuring a time interval between the control procedure signals which are transmitted and received between the facsimile apparatus, and 9 a decision unit which detects the telephone number of the remote station from a called terminal identification signal (hereafter, it is called as a CSI) and a transmitting terminal identification signal (hereafter, it is called as a TSI) among control the procedure signals transmitted and received between the facsimile apparatus, and at the same time, decides whether the telephone number is that of the specific remote station. Here, whether the number is that of the specific remote station depends on whether a bit "1" stands or not in the compacted dial table in the RAM. The column of a T-30 monitor bit located at the right end in FIG. 2 corresponds to this. The T-30 monitor bit can be prepared simultaneously when an operator registers the compacted dial number. FIG. 4 is a flowchart showing the procedure. When, at first, a predetermined function key is depressed to set an apparatus in a compacted dial registration mode, a two digit compacted dial number, for example, such as "00" and "01" is input S1, and subsequently a telephone number of a remote station is input S2, there appears a display whether it is necessary to prepare an error report on a liquid crystal display S3. In the case where the preparation is necessary, if Yes is directed, "1" is registered S4, and in the case where the preparation is not necessary, if No is directed, "0" is registered S5, respectively in the column of the T-30 monitor bit of the compacted dial table.

Next, reference numeral 10 is a signal detecting/decoding unit which detects a control procedure signal from among transmitting and receiving signals during communication, and at the same time, decodes the other predetermined data. Here, the control procedure signal is a signal indicated by marks such as NSF, DIS, and DCS in the SIGNAL column in the error report shown in FIG. 9, and the predetermined data are numerals and marks which show eye patterns and the like in the DATA column in FIG. 9. The control procedure signal and the data both of which are detected and decoded by the signal detecting/decoding unit 10 are stored in a data 1 region $A_3$ and a data 2 region $A_4$ in FIG. 3 in the form of a code. Reference numeral 11 in FIG. 1 is a modem, 12 an autodialing device, 13 a network control device, and 14 a CPU which carries out control between each unit and each device described above in order to allow communication with other stations.

Figure 5A:
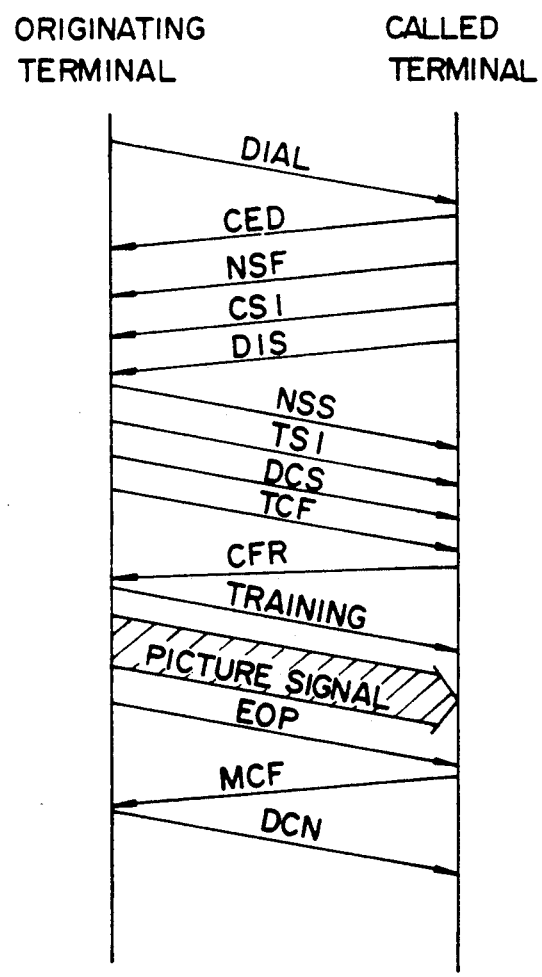
FIG. 5(a) is one when formal communication takes place.
Figure 5B:
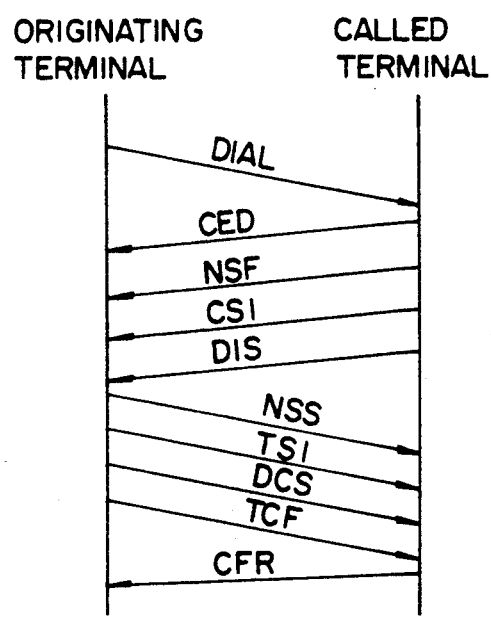
FIG. 5(b) is one of a buffer when communication errors take place.

FIGS. 5a and 5b are signal sequence diagrams explanatory of communication between facsimile stations. FIG. 5a and FIG. 5b show the case where communication is normally carried out and the case where communication errors occur on the way, a receiving preparation confirming signal CPR before a message is sent is originated from a called terminal, and then the circuit is broken, respectively.

FIG. 6 is a flowchart explanatory of the operation of a facsimile apparatus which communicates based on such the sequence. At first, when the compacted dial table. In the case where the bit "1" is recorded, the process proceeds to Step 17, and it is decided whether communication errors take place or not. Only in the case where communication errors take place, the T-30 monitor printing processing S18 is carried out to prepare an error report. In the case other than this case, in other words, in the case where, even if the remote station has a telephone number printed in the compacted dial table, the monitor bit is "0" or communication errors do not take place, an error report is not prepared.

Figure 7:
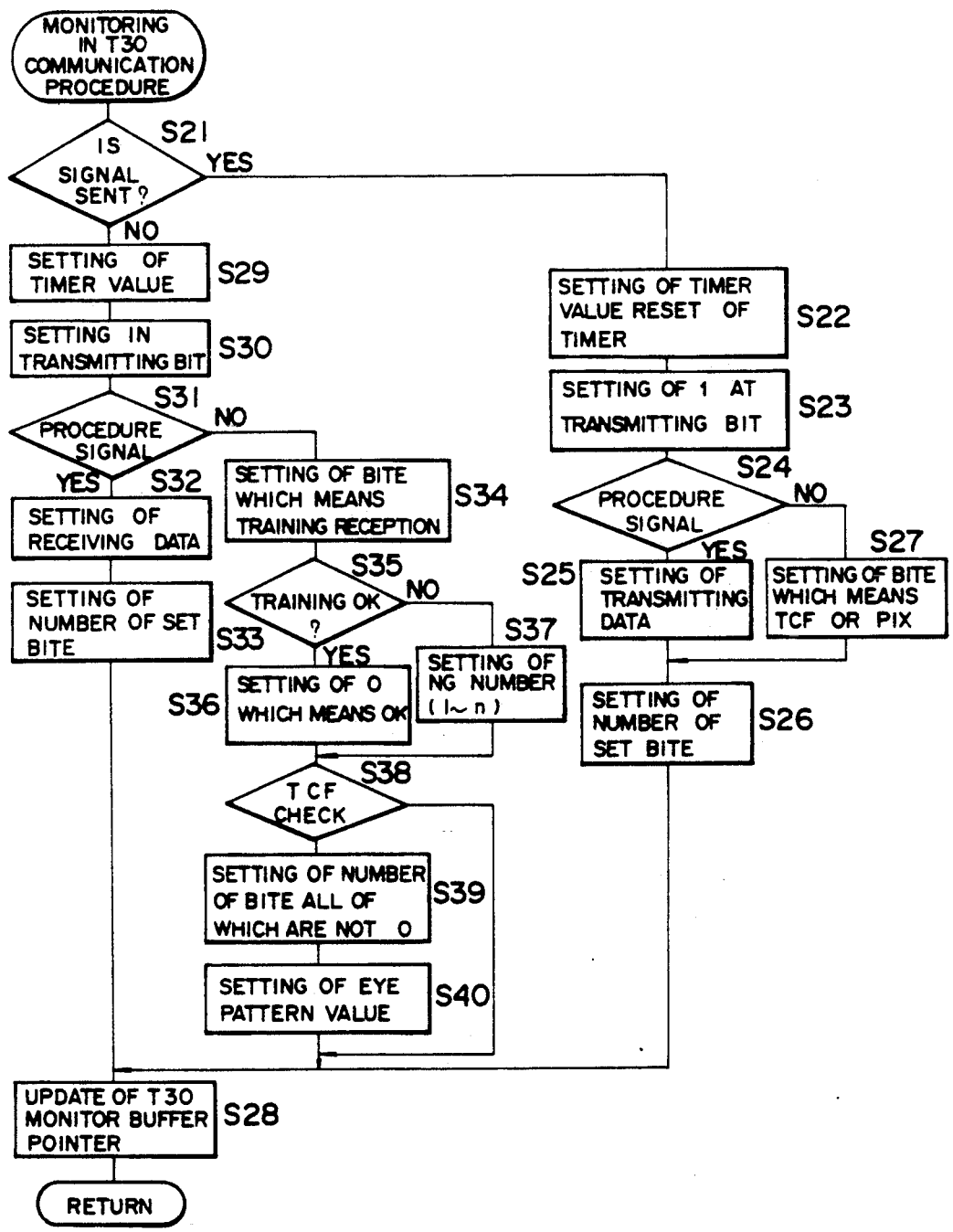

FIG. 7 is a flowchart explanatory in detail of an error monitor subroutine among T-30 communication procedures in Step S12 in FIG. 6. Incidentally, this routine is executed every time when each signal is transmitted and received. At first, it is decided whether a signal detected in Step S21 is sent out from a facsimile apparatus or it is received. This decision is carried out by checking, for example, whether the modem is in a demodulation mode or in a modulation mode. In the case whether the signal is a sending signal, the process proceeds to Step S22, and the value of the timer 8 at that time is read. The value is written into a region of [the timer value] of the T-30 monitor buffer ($A_1$ region in FIG. 3), and at the same time, the timer 8 is reset thereafter. By this, the timer 8 measures a time interval up to the detection of a subsequent control procedure signal. When the timer 8 is reset, the process proceeds to Step S23, a bit "1" is written into the $A_2$ region of the T-30 monitor buffer. This means that the detected signal is a sending signal. Subsequently, the process proceeds to Step S24, and it is decided whether the detected signal is a control procedure signal, a training signal, a high speed signal, or the like. Such the decision can be carried out by detecting the portion of FCF of an HDLC frame (not shown) constituting each signal based on the CCITT Recommendation T-30. When it is decided that the detected signal is a control procedure signal, a sending data stored in the portion of FIF of the same HDLC frame is read and stored in the data 1 region $A_3$ of the T-30 monitor buffer, and at the same time S25, the number of bites which indicates an amount of data is set in the same region S26. On the other hand, when the detected signal is not a control procedure signal in Step S24, a bite which means a training check TCF, picture image signal PIX, or the like is written into the $A_3$ region of the monitor buffer S27. Then, the number of the bite is set S26. When the setting of the number of the bite is completed in the case of the control procedure signal and in the case other than the former case, a pointer of the monitor buffer is updated by one to make a state in which new information can be written into the next address S28.

Next, in Step S21, when it is decided that the detected signal is a received signal, the process proceeds to Step S29 and the timer value is set in the buffer memory as has been done in Step S22, and at the same time, the timer 8 is reset thereafter. Subsequently, the process proceeds to Step S30, and a "0" bit which means the received signal is recorded in the $A_2$ region of the buffer memory. Thereafter, it is decided whether this received signal is a control procedure signal or not. In the case where the received signal is a control signal, the process proceeds to Step S32 and Step S33, and the received data is read from the portion of FIF of the HDLC frame which constitutes the received signal to set it in the $A_3$ region of the monitor buffer, and the number of the bite which means an amount of the data is set.

On the other hand, in Step S31, when it is decided that the received signal is not a control procedure signal, after a bite which means training reception is set Step S34, the training result of the modem is checked S35. If the training is good, a bit "0" which means the effect is set in the $A_4$ region of the monitor buffer S36. To the contrary, an NG mark other than "0" is set in the $A_4$ region for the buffer in which training ends in a failure S37. When the process ends, it is checked that a training check TCF signal is present or not in Step S38. Since the effect that the TFC signal comprises a signal of succession of "0" is prescribed in the Recommendation T-30, the number of bite in which all of the terms of the TCF signal are not "0" is set as the number of error bites in the $A_4$ region of the monitor buffer S39, and at the same time, the value of an eye pattern which becomes a clue for being informed of a state of a circuit from an output from the modem is read and set in the same region $A_4$ S40. When the processing described above is completed, the pointer of the monitor buffer is updated by one S28.

As described above, the subroutine in FIG. 7 is executed for each control signal. Accordingly, the time interval between the preceding control procedure signal and the control procedure signal in this time is recorded in the A region of the monitor buffer, and a transmitting/receiving data and the number of set bites, an eye pattern, and the like of the signal in this time are recorded in the $A_3$ and $A_4$ regions. These time interval and data are all recorded every control procedure in one communication.

Figure 8:
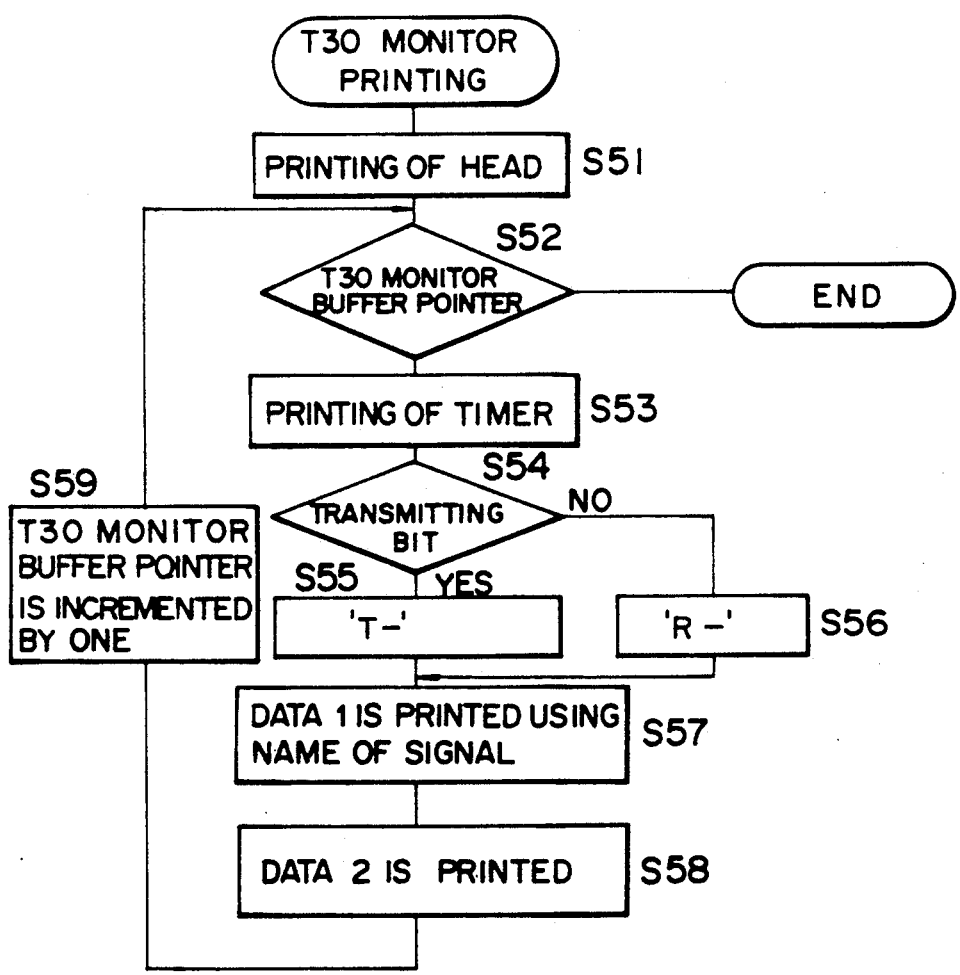

FIG. 8 is a subroutine in Step S18 in FIG. 6. As described above, the Step S18 is a processing executed only in the case where a remote station under communication therewith is a specific remote station in which a bit "1" is registered as the T-30 monitor bit, and moreover, communication errors take place. In such a case, an error report as shown in FIG. 9 is recorded on a receiving paper. In other words, at first, in Step S51, the head of the error report is printed. The head is characters of "INTERVAL", "SIGNAL", and "DATA" in FIG. 9. Subsequently, a pointer of the T-30 monitor buffer is incremented by one S52, and the time interval from the beginning of the communication to the detection of the first control procedure signal, which is recorded in the $A_1$ region, is printed S53. Next, it is decided whether the first control procedure signal is a sending signal or a received signal from the transmitting bit stored in the $A_2$ region S54. In the case where the signal is a sending signal or a received signal, a character "T-" or "R-" showing the effect is printed on the right side of the time interval S55, S56. Further, subsequently, a name of a signal recorded in the A3 region is read out to convert it to a character and print the character S57. The character corresponds to NSF in FIG. 9. Furthermore, a data stored in the A region is read out to print the data on the right side of the NSF signal S58. When printing of a data of one signal is completed, a pointer of the T-30 monitor buffer is incremented by one S59, and processings of Steps S51 to S58 are repeated again to print a time interval up to the subsequent signal, a name of a signal, a data, and the like. The processings are repeated until the pointer value reaches a final value S52. Thus, a report on communication errors as shown in FIG. 9 is prepared by executing processings in FIG. 8.

As described above, according to the facsimile apparatus related to above-mentioned embodiment of the present invention, the names of remote stations which after carries out communication therewith and are significant in the utilization of the error report are registered in a registration means, thereby allowing the error report to be prepared using a receiving paper and waste of the receiving paper to be prevented only in the case of communication errors in communication with such remote station.

The facsimile apparatus mentioned above is provided with a character generator. Next, another embodiment, in which the facsimile apparatus does not include a character generator, will be illustrated.

The facsimile apparatus is characterized in comprising a printing means for carrying out printing on a recording paper, a means for detecting various kinds of communication errors, a first memory in which a communication error display code corresponding to a communication error is coded beforehand and stored, a second memory in which a program for preparing a printing pattern corresponding to an error display code is stored, and a printing control means which reads the code data from the first memory, prepares a printing pattern based on the program stored in the second memory, and outputs the printing pattern to the printing means.

Figure 10:
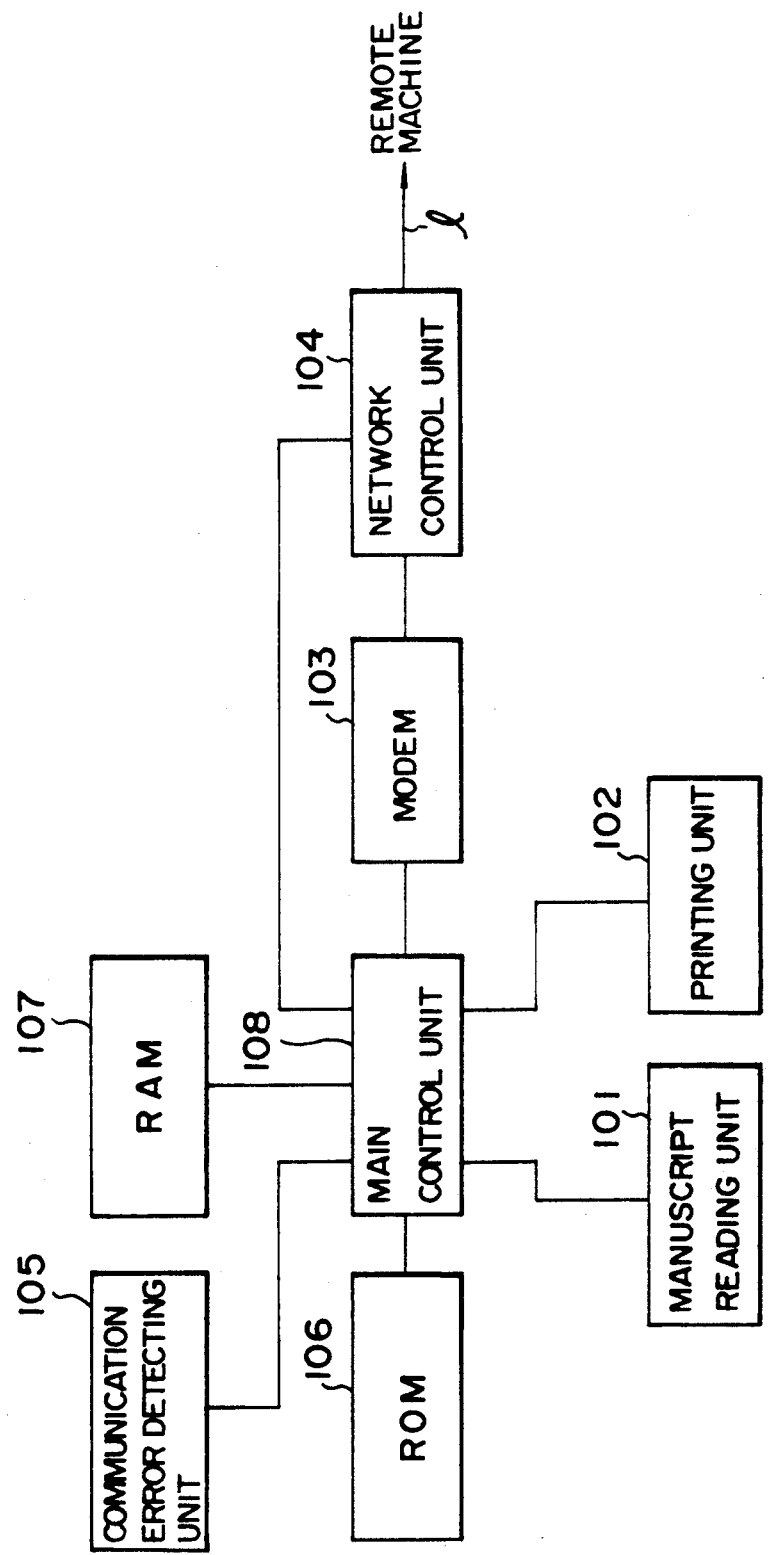
FIG. 10 is a block diagram showing the configuration of a facsimile apparatus provided with a communication error recording device related to another embodiment of the present invention.

FIG. 10 is a block diagram showing a configuration of a facsimile apparatus provided with a communication error recording device related to the present invention. In FIG. 10, reference numeral 101 is a manuscript reading unit for reading manuscripts, which is composed of a CCD (Charged Coupled Device) which receives light from a light source irradiating light on a manuscript or reflected light from a manuscript and converts it into an electrical signal corresponding to an amount of received light and the like. In FIG. 10, reference numeral 102 is a printing unit which prints on a recording paper. The printing unit 102 is composed of a thermal head and the like. Reference numeral 103 is a modem, 104 a circuit control unit which controls a circuit 1, 105 a communication error detecting unit. Also, reference numeral 106 is ROM as a first memory and a second memory, in which a system program and communication error code D is stored. Here the communication error code D is composed of 8 bits comprising an upper 4 bit data D1 and a lower order 4 bit data of D2.

Figure 11:
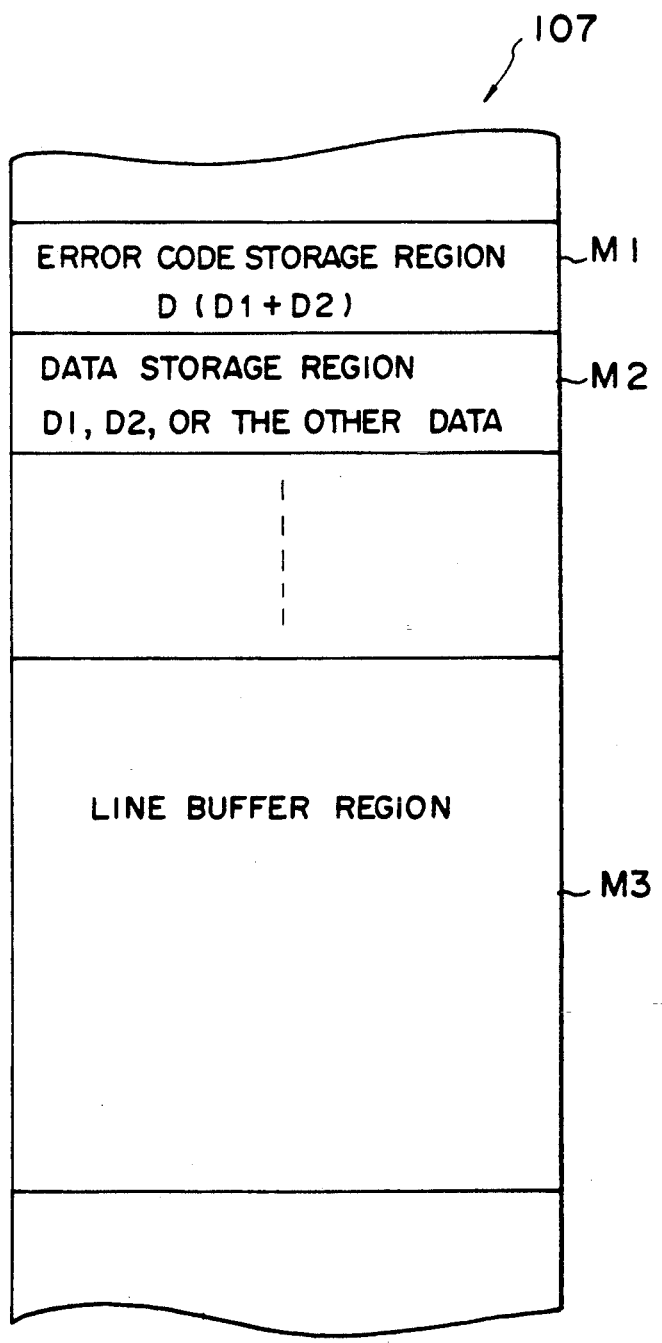
FIG. 11 is a memory map of a RAM 107.

Reference numeral 107 is a RAM. The RAM 107 includes a printing pattern data such as an error code storage region M1, a data storage region M2 which stores the upper order 4 bit data D1 and the lower order 4 bit data D2, a line buffer region M3 which stores a printing data and the like as shown in FIG. 11. The manuscript reading unit 101, the printing unit 102, the modem 103, the circuit control unit 104, the communication error detecting unit 105, the ROM 106, and ROM 107 each are individually connected to the main control unit 108.

Figure 13A:
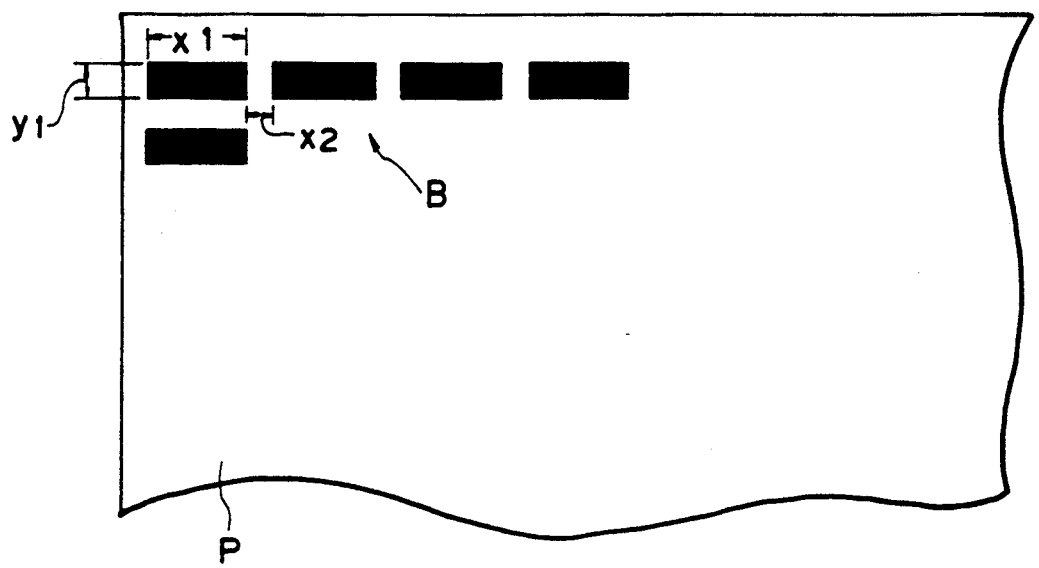
FIGS. 13a and 13b are diagrams showing a state in which an error display mark is printed on a recording paper.
Figure 13B:
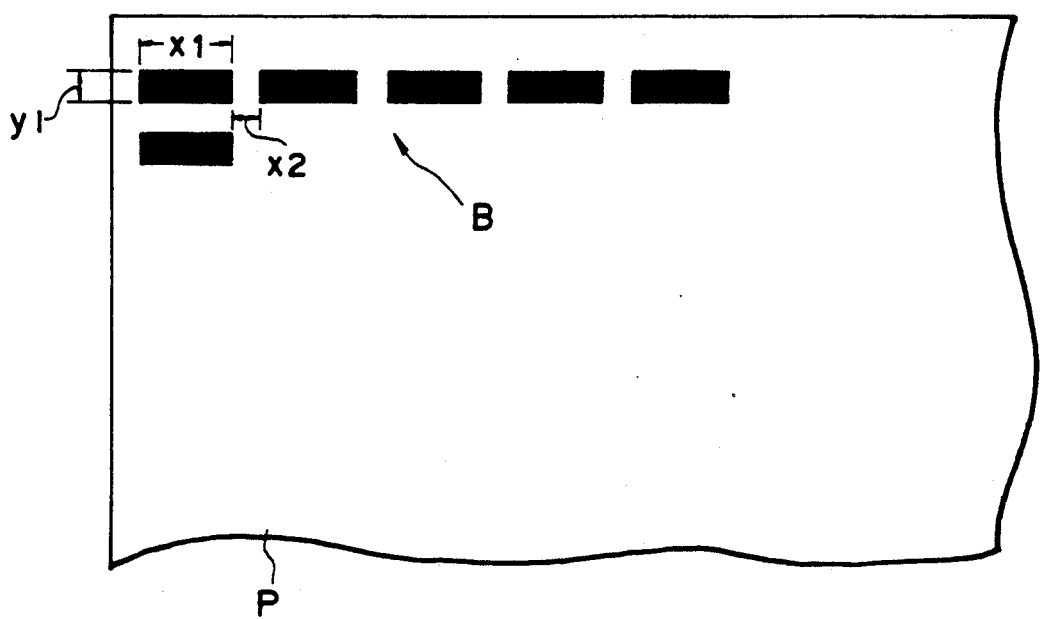

FIG. 12 is a flowchart showing a main routine when the facsimile apparatus carries out communication. At first, before the communication of a picture signal, stored contents of the RAM 107 are cleared at Step S1. The process proceeds to Step S2, and after the handshake with a distant party, ordinary communication processing is executed. During the communication processing, it is decided at Step S3 whether a communication error occurs or not. When YES, the process shifts to Step S4, an error code is read out from an error code D corresponding to the communication error from the ROM 6, and the error code D is stored in the error code storage region M1 of the RAM 7. The process proceeds to Step S5 and it is decided whether the error code D is stored in the error code storage region M1. When a communication error occurs, since the error code D is stored in the error code storage region M1 in Step S4, it is decided to be No, the process proceeds to Step S6, and message print processing is executed. By this message print processing, an error display mark B comprising bars is printed on a recording paper P as shown in FIGS. 13a and 13b. For example, when the error code is [4.1] and when the error code is [5.1], the error codes are recorded as shown in FIG. 13a and FIG. 13b, respectively. Incidentally, when the size of a recording paper is made B4, the length in width of one bar×1 is, for example, 9 mm, and the interval between a bar and an adjacent bar×2 is, for example, 1 mm. The lengthwise length y of one bar corresponds to the thickness for 8 lines. An operator reads the error code from such an error display mark B, and allows contents of a communication error to be known with reference to the code table shown in Table 1.

TABLE 1

| Error Code | Content of Code |
| --- | --- |
| 1.4 | Stop switch is depressed. |
| 1.1 | Time over |
| . | . |
| . | . |
| . | . |
| 4.1 | Data mode is not correctly received. |
| . | . |
| . | . |
| . | . |

On the other hand, when NO in Step S3, the process proceeds to Step S5. In this time, since the error code is not stored in the error code storage region M1, it is decided to be YES, and processing ends.

Figure 14:
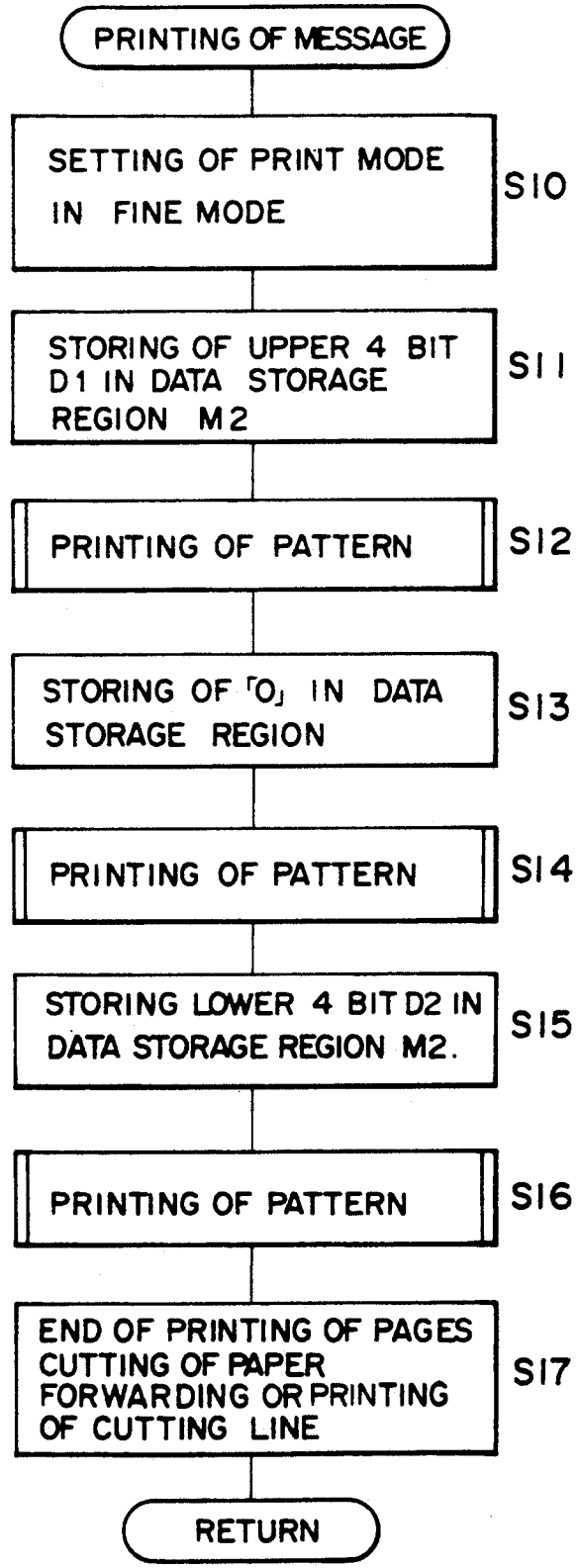
FIG. 14 is a flowchart showing a subroutine related to message print processing.

FIG. 14, is a flowchart showing a subroutine related to message print processing. At first, at Step S10, a print mode is set to a fine mode, that is, line density is set to 7.7 l/mm. At Step S11, the error code D stored in the error code storage region M1 is read, an upper 4 bit data D1 is stored in the data storage region M2. Next, at Step S12, print processing of the printing pattern based on the data D1 is executed. By this, when a bar mark corresponding to the first numeral of the error code D (for example, when the error code is [4.1], the numeral is [4]) is recorded. The process proceeds to Step S13, and [0] is stored in the data storage region M2. At Step S14, the data [0] stored in the data storage region M2 is read out to set a printing pattern all bits of which are formed by [0] in the line buffer region M3. The printing pattern is provided to the printing unit 2, by which a white portion between bar display marks in the longitudinal direction is formed.

Next, the process proceeds to Step S15, the error code D stored in the error code storage region M1 is read out to store the lower bit data D2 of the error code D in the data storage region M2. Next, at Step S16, print processing for the printing pattern based on the data D2 is executed. By this, a bar display mark corresponding to the second value of the error code (For example, when the error code is [4.1], it is [1]) is recorded on the recording paper P.

The process proceeds to Step S17, printing processing ends, and a recording paper is discharged from a recording paper discharge orifice (not shown). Incidentally, in the case the recording device is one of the kind which is provided with a cutter means, the recording paper is cut by the cutter means. In the case where the recording device is one of the kind which is not provided with a cutter means, for example, a cut line is printed.

Figure 15:
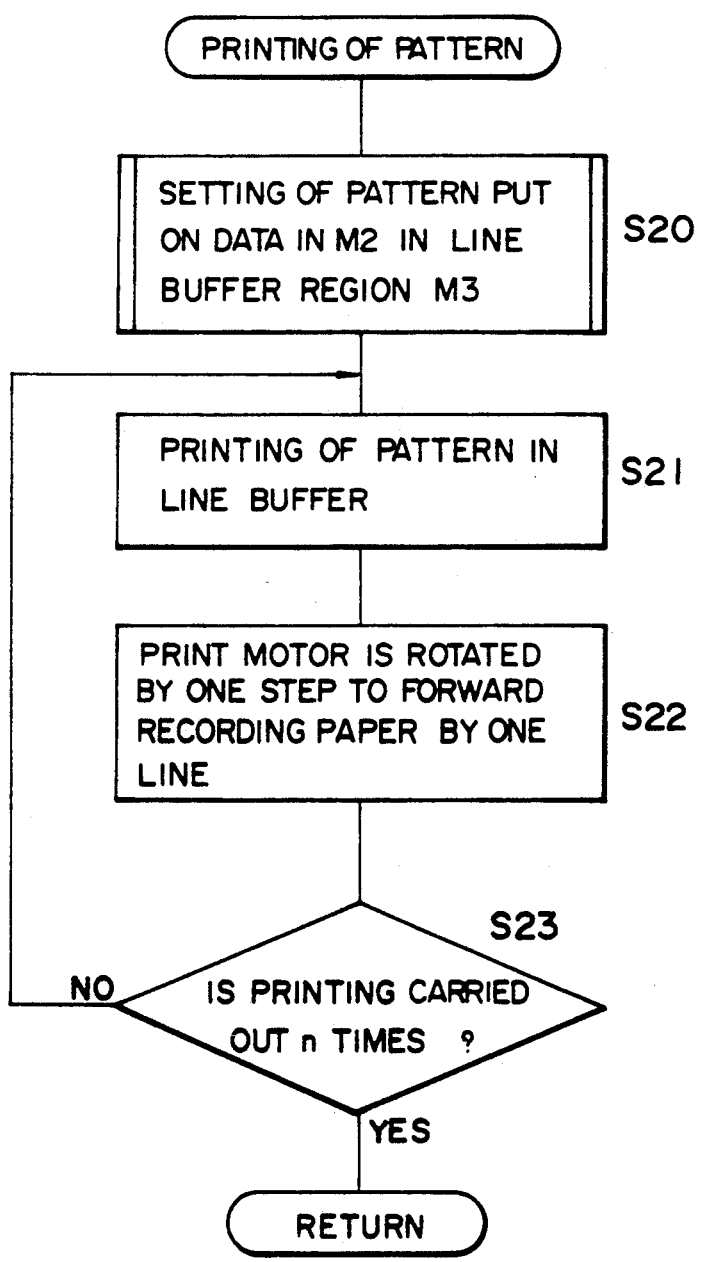
FIG. 15 is a flowchart showing a subroutine related to pattern print processing.

FIG. 15 is a flowchart a subroutine related to pattern print processing. At first, in Step S20, a printing pattern is prepared so as to make it coincide with the data stored in the data storage region M2, setting the pattern in the line buffer region M3. Concretely, the processing shown in FIG. 7 is carried out. Next, in Step S21, the printing pattern set in the line buffer region M3 is provided to the printing unit 2 to print it on the recording paper. In Step S22, a printer motor is rotatively driven by one step. By this, the recording paper is carried by one line. In Step S23, it is decided whether printing processing is carried out by n times or not (8 times in this embodiment). If NO, the process comes back to Step S21 once more. If YES, the process returns to the message print processing routine. Incidentally, the longitudinal length y1 of one bar mark is formed by the printing of n times.

Figure 16:
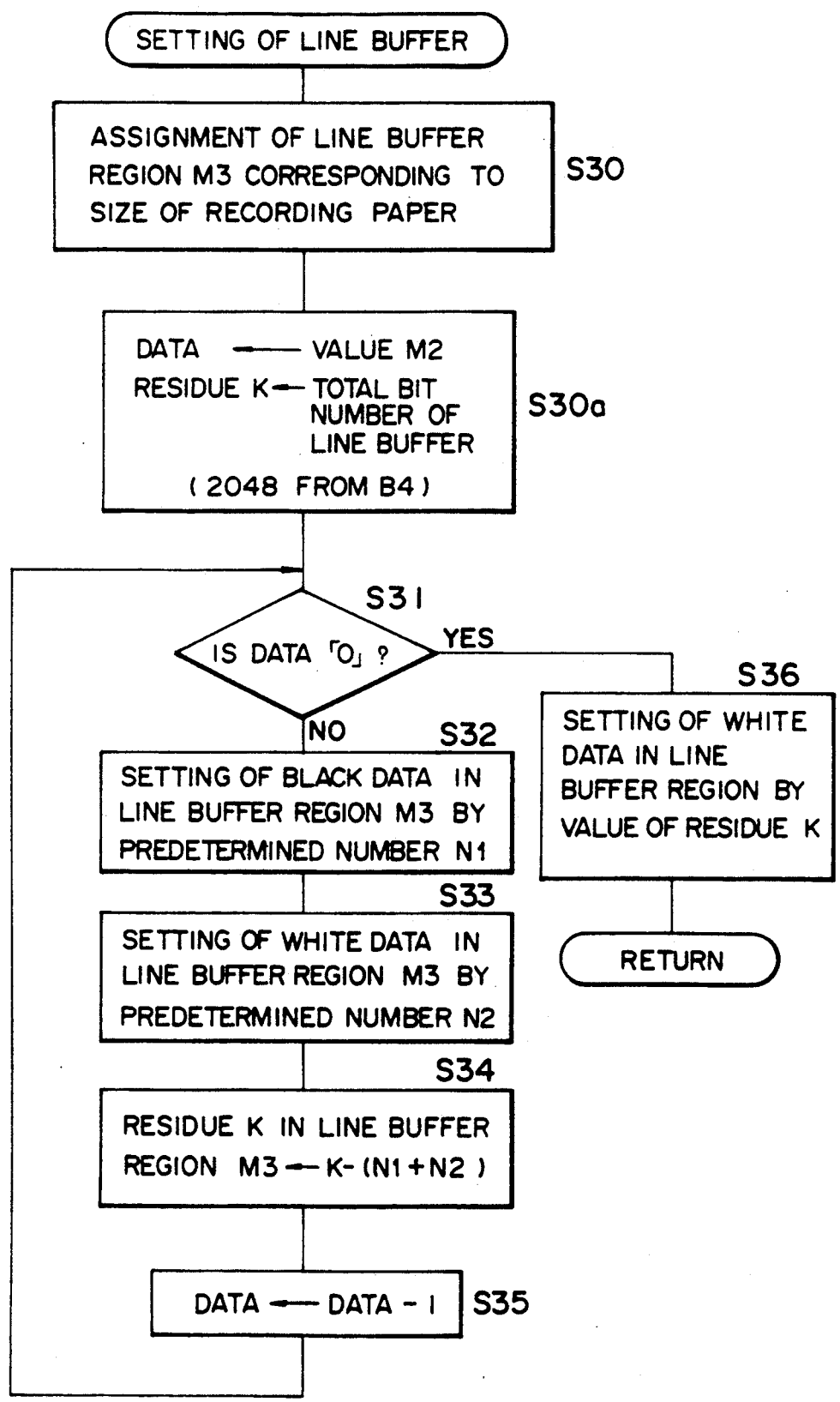
FIG. 16. is a flowchart showing a subroutine of processing for setting a printing pattern in a line buffer region M3.

FIG. 16 is a flowchart showing a subroutine of the processing for setting the printing pattern in the line buffer region M3. Incidentally, in FIG. 7, the processing in the case where the number of dots of printing in the main scanning direction is 8 dots/mm is shown. At first in Step S30, the capacity of the line buffer region M3 is arranged to the bit number of one line corresponding to the size of the recording paper. When the recording paper has B4 size, its capacity is 2048 bits. Next, the process proceeds to Step S30a, the all bit number of the line buffer region M3 is regarded as a residue K with the value of the data storage region M2 used as the data. In Step S31, it is decided whether the data is [0] or not. If No, the process proceeds to Step S32, a black data is set by a predetermined dot number in the line buffer region M3. In this embodiment, since the length×1 of one bar which forms the error display mark B is 9 mm, 9 (mm)×8 (dot/mm)=72 dots are set. Next, in Step S33, a white data is set by a predetermined dot number from the address subsequent to the final address at which the black data is set in the line buffer region M3. In this embodiment, since the interval between the bars in the cross direction, 1 (mm)×8 (dots/mm)=8 dots are set. Next, in Step S34, the residue K in the line buffer region M3 is made to be K−(N1+N2). Here, N1 is the number of the black data set in the line buffer region M3 in the Step S32, and N2 is the number of the white data set in the line buffer region M3 in the Step. Incidentally, in this embodiment, N1+N2=80.

Hereafter, the process proceeds to Step S35, the number of data is incremented by 1, and the process returns to Step S31. Until the number of data reaches [0], a closed loop processing of Step S31→Step S32→Step S33→Step S34→Step S35→Step S31 is executed. By this, the printing pattern corresponding to the data is set in the line buffer region M3. When the data reaches [0], the process transfers from Step S31 to Step S36, and the white data is set by the value of the residue K in the line buffer region M3. By this, the data of one line is set in the line buffer region M3. Thereafter, the processing returns to the Step S21.

Figure 17A:
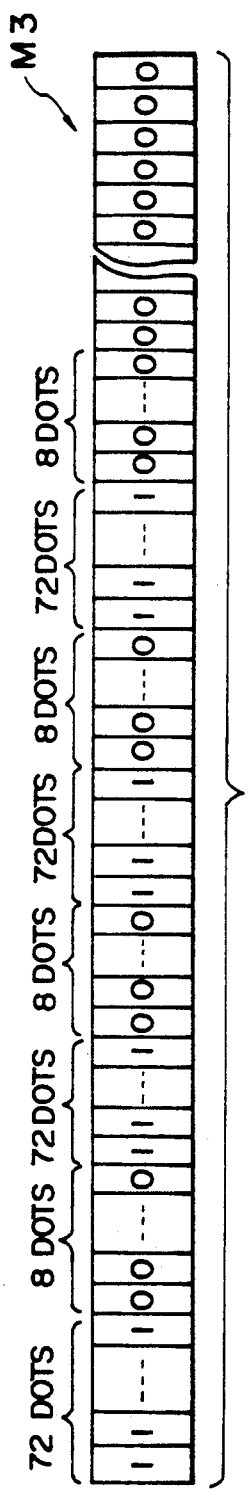
FIGS. 17a, 17b and 17c are diagrams showing states in which the printing pattern is set in the line buffer region M3.
Figure 17B:
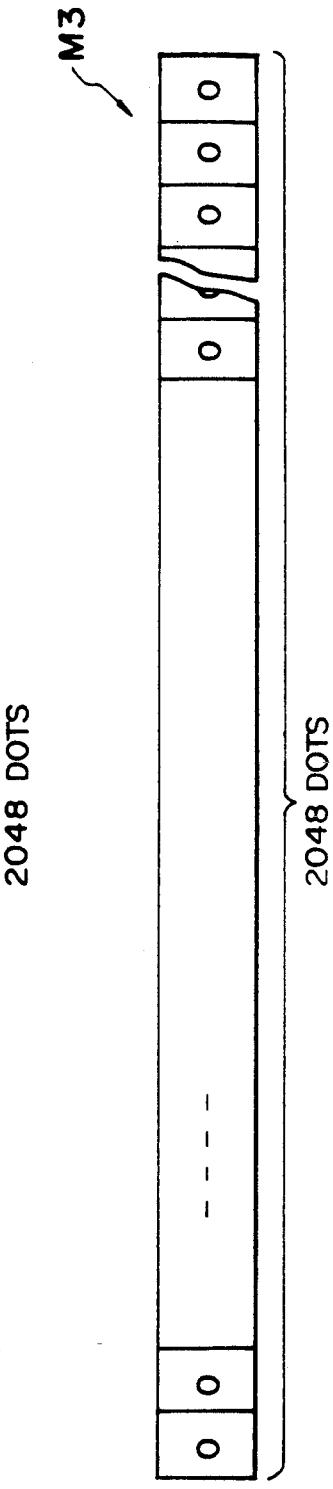

Next, let us take the case where the error of the error code [4.1] occurs during communication by way of example to concretely describe the process until the error display mark B is printed on the recording paper P. At first, in Step S1, if the contents of the RAM 107 are cleared, communication is carried out in Step S3, an error of the code [4.1] occurs, the process shifts to Step S3 and then Step S4, and the code [4.1] is stored in the error code storage region M1 of the RAM 107. Then, the process shifts to Step S6, and a subroutine related to the message print processing shown in FIG. 14 is called. In the subroutine shown in FIG. 14, at first, in Step S10, a print mode is set to a fine mode, and in Step S11, the upper bit D1 showing [4] of the error code is stored in the data storage region M2. In Step S12, pattern print processing is executed. In other words, the subroutine related to the pattern print processing shown in FIG. 15 is called. In the subroutine shown in FIG. 15, at first, there is executed the processing by which a pattern is made to coincide with the data to set it in the line buffer region M3. In other words, a subroutine related to processing of setting to the line buffer region M3 shown in FIG. 16 is called. In the subroutine in FIG. 16, at first, the capacity of the line buffer region M3 is allotted to 2048 bits in Step S30. The closed loop processing from Step S31→Step S32→Step S33→Step S34→Step S35→Step S31 is executed by four times. Furthermore, the processing of step S36 is executed. By this, the printing for one line is set in the line buffer region M3 as shown in FIG. 17a. Thereafter, the processing returns to Step S21, the processing of the closed loop Step S21→Step S22→Step S23→Step S21 is executed, and the bar mark which indicates [4] is printed on the recording paper P. Thereafter, the processing returns to Step S13. The process proceeds from Step S13 to Step S14. At this Step S14, the subroutine in FIG. 15 is called. In Step S20, the subroutine in FIG. 16 is called. The processing proceeds from Step S30 to Step S31, and since the answer is No in Step S31, the process shifts from Step S31 to Step S36. By the processing in Step S36, the printing patterns all of which are composed of white data are set in the line buffer region M3 as shown in FIG. 17b. The process returns from Step S36 to Step S21, and the processing of the closed loop Step S21→Step S22→Step S23→Step S21 is executed. By this, a white portion between bars in the longitudinal direction is formed on the recording paper P. Incidentally, after Step S23, the process returns to Step S15.

Figure 17C:
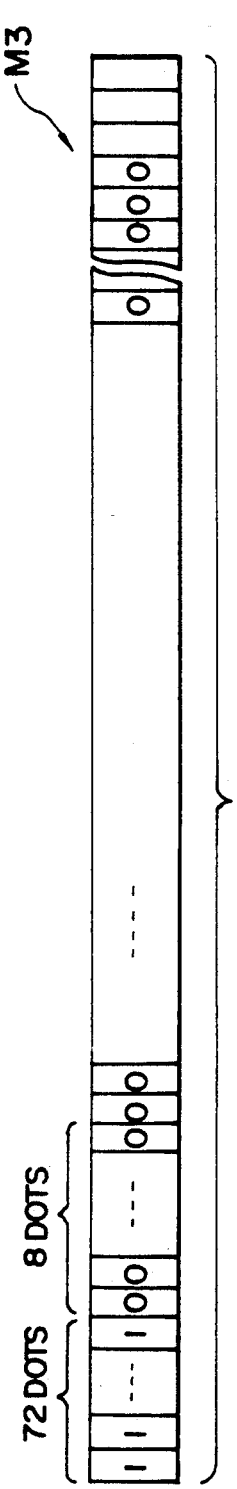

In Step S15, the lower 4 bit D2 which indicates [1] is stored in the data storage region M2, the process proceeds to Step S16. In Step S16, the subroutine in FIG. 15 is called. In Step S20 in FIG. 15, the subroutine in FIG. 16 is called. The process proceeds to Step S31 from Step S32, and moreover, the processing of the closed loop Step S31→Step S32→Step S33→Step S34→Step S35→Step S31 is once executed. Furthermore, the processing of Step S36 is executed to set the printing pattern for one line shown in FIG. 17c in the line buffer region M3. Thereafter, the processing returns to Step S21, and the processing of the closed loop Step S21→Step S22→Step S23→Step S21 is executed to print the bar mark which indicates [1] on the recording paper P. By this, the error display mark B which indicates [4.1] is recorded on the recording paper P. The processing returns to Step S17, print processing of a page ends, and the recording paper P is discharged from a paper outlet. Incidentally, the recording paper is cut on the way to the outlet. Accordingly, an operator can know that the error code is [4.1] from the error display mark B printed on the recording paper P. As a result, he can know the error contents with reference to the code table.

In the above-mentioned embodiment, though the error display mark B recorded on the recording paper P is only one, the error display mark B may be recorded one by one on the right and left of the recording paper P, and the mark B on the left may be regarded, for example, as an error on the transmitter side, and the mark B on the right, may be regarded for example, as an error on the receiver side.

Figure 18:
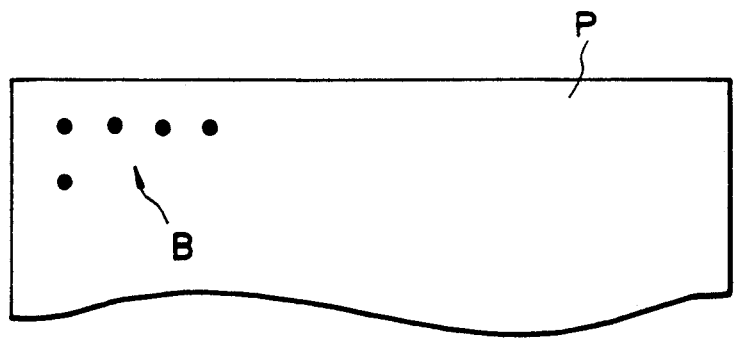
FIG. 18 and FIG. 19 each are a diagram showing an example of a state of printing of other error display mark.
Figure 19:
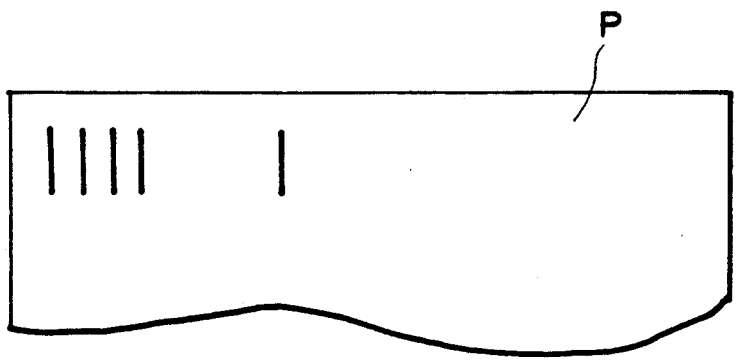

The error display mark B is not restricted to that in the above-mentioned embodiment, but marks as shown in FIG. 18 and FIG. 19 may be employed.

The transmission error recording apparatus related to the present invention is applicable to communication apparatus other than facsimile apparatus.

As described above, the above-mentioned embodiment of present invention allows communication errors to be recorded without using any character generator. Consequently, it allows the memory capacity and the program capacity to be largely reduced by the same amount as that by which the character generator is unnecessary.

What is claimed is:

1. A facsimile apparatus comprising:
   a buffer memory which stores therein each control procedure signal for transmission and reception from among transmitting and receiving signals;
   registration means for registering whether or not it is necessary to prepare an error report in the case where communication errors occur in a communication with any remote station;
   specific station deciding means for deciding whether or not a remote station under communication is a specific remote station registered in the registration means from a transmitting terminal selection signal (TSI) or a called terminal selection signal (CSI);
   detecting means for detecting the occurrence of communication errors in a communication with a remote station;

a printing unit for converting information stored in said buffer memory into characters and numerals, and for printing the characters and numerals using a predetermined report format; and a control unit for controlling the printing unit to print the contents of said buffer memory when a remote station under communication is decided to be a specific remote station registered in said registration means, and upon a detection by the detection means of a communication error in a communication with the remote station.

2. The facsimile apparatus according to claim 1, comprising timer means which measures a time interval from a preceding control procedure signal to a present control procedure signal under facsimile communication, wherein the time interval is read out from said timer means at each transmission of each control procedure signal, and the time interval is stored in said buffer memory.

3. The facsimile apparatus according to claim 1, comprising means for clearing the stored contents of said buffer memory at the beginning of each communication.

4. A communication error recording apparatus operable with a facsimile apparatus connectible for communicating with any one of a plurality of remote stations, the plurality of remote stations including at least one specific remote station, the communication error recording apparatus comprising:

printing means for carrying out printing on a recording paper;

means for detecting various kinds of communication errors;

a first memory section in which a communication error display code corresponding to a communication error is stored;

a second memory section in which a program for preparing a printing pattern corresponding to an error display code is stored;

means for identifying, based on at least one of a first transmitted signal and a second transmitted signal, whether a remote station with which the facsimile apparatus is connected for communication is a specific remote station; and a printing controller which, upon detection of a communication error by the means for detecting and upon identification of a remote station as a specific remote station by the means for identifying, reads the code data from the first memory, prepares a printing pattern based on the program stored in the second memory, and outputs the printing pattern to the printing means.

5. A communication error recording apparatus according to claim 4, wherein the first transmitted signal comprises a transmitting terminal identification signal and the second transmitted signal comprises a called terminal identification signal.

6. A facsimile apparatus connectible for communication with any one of a plurality of remote stations, the plurality of remote stations including at least one specific remote station, the apparatus comprising:

error detecting means for detecting a communication error occurring in a communication with one of the remote stations;

determining means for determining, based on at least one of a first transmitted signal and a second transmitted signal, whether a remote station connected for communication with the apparatus is a specific remote station;

an error display for displaying error indicia upon a detection of a communication error by the error detecting means occurring in a communication with a remote station determined to be a specific remote station by the determining means.

7. A facsimile apparatus as claimed in claim 6, further comprising:

a first memory section which stores a communication error display code corresponding to a communication error; and a second memory section which stores a program for preparing a printing pattern corresponding to the error display code stored by the first memory section;

wherein the error display comprises printing means for printing a pattern based on the program stored by the second memory section.

8. A facsimile apparatus according to claim 6, wherein the first transmitted signal comprises a transmitting terminal identification signal and the second transmitted signal comprises a called terminal identification signal.

9. A communication method for a facsimile apparatus connectible for communication with any one of a plurality of remote stations, the plurality of remote stations including at least one specific remote station, the method comprising the steps of:

connecting the facsimile apparatus with one of the remote stations for communication;

detecting a communication error occurring in a communication between the facsimile apparatus and the remote station connected therewith;

determining, based on at least one of a first transmitted signal and a second transmitted signal, whether the remote station connected for communication with the facsimile apparatus is a specific remote station; and displaying error indicia upon a detection of a communication error occurring in a communication with a remote station determined to be a specific remote station.

10. A method as claimed in claim 9, further comprising the steps of:

storing, in a first memory section, an error display code corresponding to a communication error; and storing, in a second memory section, a program for preparing a printing pattern corresponding to the error display code stored in the first memory section;

wherein the step of displaying comprises the step of printing a pattern based on the program stored in the second memory section.

11. A method according to claim 9, wherein the first transmitted signal comprises a transmitting terminal identification signal and the second transmitted signal comprises a called terminal identification signal.

* * * * *